US009699040B2

(12) United States Patent
Peacock et al.

(10) Patent No.: US 9,699,040 B2
(45) Date of Patent: Jul. 4, 2017

(54) SYSTEMS AND METHODS FOR MONITORING GLOBALLY DISTRIBUTED REMOTE STORAGE DEVICES

(71) Applicant: Vivint, Inc., Provo, UT (US)

(72) Inventors: Alen Lynn Peacock, Orem, UT (US); Paul Cannon, American Fork, UT (US); John Timothy Olds, Sandy, UT (US); Andrew Harding, American Fork, UT (US); Jeffrey Michael Wendling, West Jordan, UT (US)

(73) Assignee: Vivint, Inc., Provo, UT (US)

( * ) Notice: Subject to any disclaimer, the term of this patent is extended or adjusted under 35 U.S.C. 154(b) by 241 days.

(21) Appl. No.: 14/503,095

(22) Filed: Sep. 30, 2014

(65) Prior Publication Data

US 2016/0094419 A1    Mar. 31, 2016

(51) Int. Cl.
*G06F 15/173* (2006.01)
*H04L 12/26* (2006.01)
*H04L 29/08* (2006.01)

(52) U.S. Cl.
CPC ............ *H04L 43/04* (2013.01); *H04L 43/12* (2013.01); *H04L 67/1097* (2013.01)

(58) Field of Classification Search
CPC .... H04L 43/06; H04L 12/2602; H04L 43/062
USPC .......................................................... 709/224
See application file for complete search history.

(56) References Cited

U.S. PATENT DOCUMENTS

| 6,823,382 | B2 | 11/2004 | Stone |
| 6,842,776 | B1 | 1/2005 | Poisner |
| 8,131,838 | B2 | 3/2012 | Bornhoevd et al. |
| 8,296,413 | B2 | 10/2012 | Bornhoevd et al. |
| 8,768,892 | B2 * | 7/2014 | Myerson ................. G06N 5/04 700/104 |
| 8,838,779 | B2 * | 9/2014 | Gopisetty ........... G06F 11/3495 370/255 |
| 9,058,259 | B2 * | 6/2015 | Marvasti ............. G06F 11/0709 |
| 9,225,608 | B1 * | 12/2015 | Gabrielson .......... H04L 41/147 |
| 2002/0069037 | A1 * | 6/2002 | Hendrickson ....... H04L 12/2602 702/186 |
| 2003/0145082 | A1 | 7/2003 | Son |
| 2005/0021748 | A1 * | 1/2005 | Garcea ................ G06F 11/3447 709/224 |

(Continued)

FOREIGN PATENT DOCUMENTS

KR    10-2003-0045238 A    6/2003

OTHER PUBLICATIONS

PCT International Search Report for PCT International Application No. PCT/US2015/048034, mailed Feb. 1, 2016 (3 pp.).

*Primary Examiner* — Phuoc Nguyen
(74) *Attorney, Agent, or Firm* — Holland & Hart, LLP

(57) ABSTRACT

Methods and systems are described for remotely monitoring a plurality of distributed remote storage devices. An example computer implemented method includes locally collecting monitoring data for one of the plurality of distributed remote storage devices, and periodically sending at least one of an aggregate of the locally recorded monitoring data and a summary of the locally recorded monitoring data to a remote location. The remote location includes at least one of another one of the plurality of distributed remote storage devices, at least one central server, and a set of the plurality of distributed remote storage devices.

20 Claims, 10 Drawing Sheets

(56) References Cited

U.S. PATENT DOCUMENTS

| | | | |
|---|---|---|---|
| 2006/0271384 A1* | 11/2006 | Munson | G06F 9/465 709/203 |
| 2008/0155091 A1 | 6/2008 | Gokhale et al. | |
| 2009/0248712 A1 | 10/2009 | Yuan | |
| 2010/0088354 A1* | 4/2010 | Wu | G06F 11/3409 707/827 |
| 2010/0229157 A1* | 9/2010 | Ergan | G06F 11/0748 717/128 |
| 2011/0078291 A1 | 3/2011 | Bickson et al. | |
| 2012/0243416 A1 | 9/2012 | Hussain et al. | |
| 2015/0081885 A1* | 3/2015 | Thomas | G06F 9/45558 709/224 |

* cited by examiner

SYSTEMS AND METHODS FOR MONITORING GLOBALLY DISTRIBUTED REMOTE STORAGE DEVICES

BACKGROUND

Advancements in media delivery systems and media-related technologies continue to increase at a rapid pace. Increasing demand for media has influenced the advances made to media-related technologies. Computer systems have increasingly become an integral part of the media-related technologies. Computer systems may be used to carry out several media-related functions. The wide-spread access to media has been accelerated by the increased use of computer networks, including the Internet and cloud networking.

Many homes and businesses use one or more computer networks to generate, deliver, and receive data and information between the various computers connected to computer networks. Users of computer technologies continue to demand increased access to information and an increase in the efficiency of these technologies. Improving the efficiency of computer technologies is desirable to those who use and rely on computers.

With the wide-spread use of computers has come an increased presence of in-home computing capability. As the prevalence and complexity of home computing systems and devices expand to encompass other systems and functionality in the home, opportunities exist for improved communication between devices distributed across many homes, such as data storage devices in peer-to-peer networks.

SUMMARY

Methods and systems are described for remotely monitoring a plurality of distributed remote storage devices. An example computer implemented method includes locally collecting monitoring data for one of the plurality of distributed remote storage devices, and periodically sending at least one of an aggregate of the locally recorded monitoring data and a summary of the locally recorded monitoring data to a remote location. The remote location includes at least one of another one of the plurality of distributed remote storage devices, at least one central server, and a set of the plurality of distributed remote storage devices.

In one example, the monitoring data may include at least one of processor utilization, disk space utilization, input/output load, and network traffic statistics. The monitoring data may include at least one of counts of method invocations, timing data about execution paths, and error and success path counts. The method may include confirming receipt of the at least one of an aggregate of the locally recorded monitoring data and a summary of the locally recorded monitoring data. The method may include locally storing the monitoring data on the one of the plurality of distributed remote storage devices. The method may include storing the at least one of an aggregate of the locally recorded monitoring data and a summary of the locally recorded monitoring data on the one of the plurality of distributed remote storage devices. The at least one of an aggregate of the locally recorded monitoring data and a summary of the locally recorded monitoring data may be for monitoring data collected within a time period, and periodically sending the monitoring data may include sending monitoring data from successive time periods.

Another embodiment is directed to a computer-program product for remotely monitoring a plurality of distributed remote storage devices. The computer-program product includes a non-transitory computer-readable medium storing instructions executable by a processor to receive recorded monitoring data from at least one of the plurality of distributed remote storage devices, locally collect monitoring data, and transmit the locally collected monitoring data and the recorded monitoring data periodically to at least one of another one of the plurality of distributed remote storage devices and a central server.

In one example, the received recorded monitoring data may include receiving recorded monitoring data from two or more of the plurality of distributed remote storage devices. The instructions may be executable by a processor to cache the locally collected monitoring data between transmitting the locally collected monitoring data periodically. The recorded monitoring data may include at least one of an aggregate of the recorded monitoring data and a summary of the recorded monitoring data. The recorded monitoring data may be collected locally on the at least one the plurality of distributed remote storage devices. The monitoring data may include at least one of processor utilization, disk space utilization, input/output load, network traffic statistics, counts of method invocations, timing data about execution paths, and error and success path counts. The plurality of distributed remote storage devices may be control panels for home automation systems.

A further example relates to an apparatus for remotely monitoring a plurality of distributed remote storage devices. The apparatus includes a processor, a memory in electronic communication with the processor, and instructions stored in the memory. The instructions are executable by the processor to receive recorded monitoring data from at least one of the plurality of distributed remote storage devices, locally collect monitoring data, locally store the locally collected monitoring data and the received recorded monitoring data, and transmit the locally collected monitoring data and the recorded monitoring data periodically to at least one of another one of the plurality of distributed remote storage devices and a central server.

In one example, locally collecting monitoring data, locally storing the locally collected monitoring data and the received recorded monitoring data, and transmitting the locally collected monitoring data and the received recorded monitoring data may be performed by one of the plurality of distributed remote storage devices. The recorded monitoring data may be collected locally by the at least one of the plurality of distributed remote storage devices. Transmitting the locally collected monitoring data and the recorded monitoring data may include transmitting at least one of a summary and an aggregate of the locally collected monitoring data and the recorded monitoring data. Receiving recorded monitoring data may include receiving at least one of a summary and an aggregate of recorded monitoring data from two or more of the plurality of distributed remote storage devices. The instructions may be executable by the processor to receive a request to re-transmit the locally collected monitoring data and the recorded monitoring data.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Figure 1:
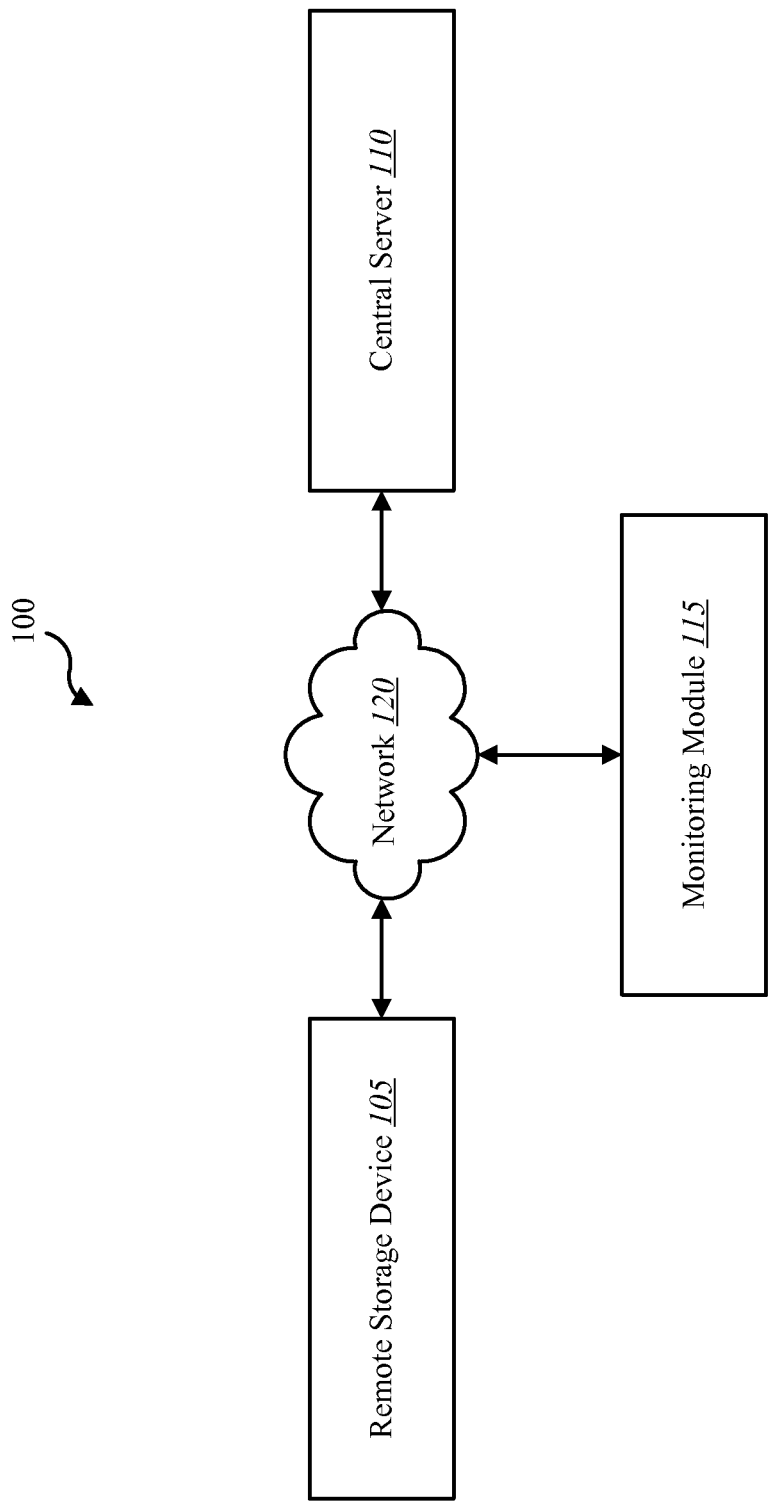
FIG. 1 is a block diagram of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The present disclosure is directed generally to remote monitoring of computing resources, and more particularly relates to remote monitoring of devices distributed across the globe and not physically accessible to a system administrator.

Monitoring services may include services that watch other services and collect statistics and other data on their performance and functionality. Monitoring services are a fairly mature area within datacenter operations. Monitoring services in an environment having an order of magnitude more components (e.g., hundreds of thousands or millions of components) than is typically found inside datacenters have not been developed, particularly in environments in which the ratio of users to devices approaches 1 (as compared to datacenters in which a few devices (e.g., servers) service thousands of users concurrently).

In addition to the scaling challenges of these environments, network topology challenges exist when the devices are not housed in sanitized network environments such as in datacenters where the devices are under complete control of the network administrators. Additionally, these environments may include asymmetrical connectivity characteristics due to network address translations (NATs) and firewalls, and bandwidth characteristics. Further, housing devices in the hands of the end users may also present unique trust and security challenges for monitoring purposes.

The devices being monitored according to the present disclosure typically include both storage capacity and computing capacity. The devices may be in communication with each other via a peer-to-peer (p2p) network, wherein each device is considered a node in the network and produces a stream of data. Such data may include metrics such as processor utilization, disk space utilization, input/output load, network traffic statistics, etc. The data may also include higher level data about the operation of software components, such as counts of method invocations, timing data about execution paths, error and success path counts, etc. In a normal server environment, this type of data is generally sent to a number of central collectors for analysis. Typically, the collectors gather data from hundreds of servers.

In a p2p network, which can scale to hundreds of thousands or even millions of nodes, a central group of collectors in a single location or a small number of locations can be made to deal with the load monitoring data from all nodes. However, this arrangement presents several problems, including difficulty in scaling the collection servers appropriately as the p2p system grows, and scaling the amount of bandwidth available at the central collection site(s) as the p2p system grows. Instead, each node in the network can locally record its own data and periodically send aggregate or summary data to another location (so that it can be made available even when the node is offline, which is when the data is often most useful). The other location can be a set of central servers as described above, or it can be another node in the p2p network, or a set of other nodes in the p2p network.

Traditional monitoring systems typically provide a central collection system that can be accessed locally via fast, dedicated network connections. In the distributed remote storage device environment in which the present invention operates, collection services are distant and accessible over sometimes low bandwidth and high latency network connections.

The present disclosure may provide for caching much of the monitoring data locally and sending the cached data in periodic aggregate bursts to a collector instead of continuously blasting, and broadening the central collector by making it hierarchically distributed. Caching data locally allows the system to be more efficient in total network resources, and also makes the data easier to re-transmit if data is lost in transit. Losing data in transit is typically a more severe problem over distant, low bandwidth, high latency links than over direct connections between machines in a datacenter.

Broadening the central collector with hierarchically distributed systems according to the present disclosure permits use of devices in the network itself as temporary caching collectors for data while on its way to the central collector. The hierarchal structure may help on distant, low bandwidth, high latency links. The hierarchal structure may also help lessen the load on centralized monitoring services, adding bandwidth and processing resources.

Much of the data collected in monitoring systems is time series data. Many of the ways that time series data is used is in aggregate summaries: averages, totals, means, medians, percentiles, etc. Aggregate time series data can be transmitted more efficiently in a hierarchically distributed collection system, because each intermediate node can summarize incoming data into a much smaller stream to pass on to the next node in the network.

FIG. 1 is a block diagram illustrating one embodiment of environment 100 in which the present systems and methods may be implemented. Environment 100 includes a remote storage device 105, a central server 110, a monitoring module 115, and a network 120. Although monitoring module 115 is shown as a separate component of the environment 100, it is possible to include monitoring module 115 as part of either or both of remote storage device 105 and central server 110. Further, while a single remote storage device 105 is shown in environment 100, it is possible to have a plurality of remote storage devices 105 (e.g., nodes), such as on the order of tens of thousands, hundreds of thousands, or millions of remote storage devices 105. Monitoring module 115 may be included in or at least operate on any one or all of the remote storage devices 105.

The environment 100 differs from other types of systems in which the storage devices are consolidated in a single data center or in a few high density datacenters in which the system administrator has complete physical control over the storage devices. The storage devices, according to the present disclosure, are typically distributed in a plurality of remote locations, and are typically stored as separate and singular storage devices for each given physical location. In at least some examples, the ratio of users to storage devices is approximately 1, as compared to data centers in which the ratio of devices to users is significantly higher. Another distinct difference between the distributed remote storage device network of the present disclosure and those of consolidated datacenters is the lack of control over network topology of where the user plugs in each of the remote storage devices 105. Further, the network administrator has little control over when and how the remote storage devices 105 are connected to the network since each individual user has the option of connecting the remote storage device 105 to the network whenever and wherever they would like to. These and other characteristics of the distributed remote storage device network within which the present disclosure is operable present challenges for collecting and conveying monitoring data, such as the monitoring data defined above related to operation and status of each individual remote storage device 105.

The remote storage devices 105 may include, for example, an operating system, data storage capacity, and the ability to communicate with other remote storage devices and other remote resources such as, for example, central server 110. Monitoring module 115 may facilitate communication between remote storage device 105 and other remote storage devices and/or central server 110. Typically, the components of environment 100 maintain communication via network 120. Network 120 may utilize any available communication technology such as, for example, Bluetooth, Zigby, Z-wave, infrared (IR), radio frequency (RF), near field communication (NFC), or other short distance communication technologies. In other examples, network 120 may include cloud networks, local area networks (LAN), wide area networks (WAN), virtual private networks (VPN), wireless networks (using 802.11 for example), and/or cellular networks (e.g., using 3G and/or LTE), etc. In some embodiments, network 120 may include the internet.

Monitoring module 115 may operate to locally collect monitoring data for remote storage device 105. Monitoring module 115 may cache, temporarily store, or permanently store the monitoring data for remote storage device 105. The caching and restoring of the monitoring data may occur locally on remote storage device 105. Periodically, monitoring module 115 may send out that monitoring data to another location such as, for example, central server 110 or a different remote storage device in the network. Eventually, the monitoring data will be transmitted to central server 110 if not initially transmitted there. Central server 110 may operate to not only collect the monitoring data from remote storage device 105 and other storage devices in the network, but also may consolidate, analyze, summarize, or otherwise process the monitoring data for any of a number of desired purposes. Central server 110 may also communicate back to remote storage device 105. For example, central server 110 may provide confirmation of receipt of the monitoring data. Central server 110 may provide instructions to remote storage device 105 such as, for example, a request to resend the monitoring data or portions thereof, alter a frequency at which the monitoring data is delivered from remote storage device 105, and/or instructions for creating a hierarchy of remote storage devices 105 for purposes of collecting, saving, aggregating, and/or transmitting the monitoring data to central server 110. Monitoring module 115 may facilitate communications from central server 110 to remote storage device 105 and other storage devices in the network.

Monitoring module 115 may operate to summarize or aggregate the monitoring data associated with remote storage device 105. Aggregating the data may include collecting the monitoring data into a packet or a data stream, consolidating or compressing the monitoring data, or the like. Transmitting aggregate data from remote storage device 105 to central server 110 may reduce the amount of resources required and may limit the number and frequency of communications between remote storage device 105 and central server 110. Alternatively, monitoring module 115 may summarize the monitoring data associated with remote storage device 105. The summary may include information about trends, overall performance characteristics, and other high level information regarding and/or representing the monitoring data. The summary may have a significantly reduced data size as compared to the aggregate data, which may facilitate easier transmission from remote storage device 105 to central server 110 and reduce allocation of resources to provide communication of the monitoring data.

Monitoring module 115 may operate at least in part to determine what information from the monitoring data can be aggregated and/or summarized for purposes of transmission to central server 110. In at least some examples, some of the monitoring data is neither aggregated nor summarized, while other of the monitoring data is aggregated and/or summarized prior to transmission to central server 110. Monitoring module 115 may operate to transmit monitoring data from remote storage device 105 to central server 110 on a periodic basis such as in the range of, for example, about 1 second to about 10 minutes or every hour, and more preferably about every 1 minute to 5 minutes. Monitoring module 115 may transmit monitoring data collected during the period of time that has elapsed since the prior transmission. In at least some examples, monitoring module 115 caches or stores the monitoring data for one or more predetermined time periods (e.g., periods of time between transmissions), or some other time period sufficient to confirm receipt of the transmitted monitoring data to central server 110. In at least some examples, monitoring module 115 automatically deletes or erases the monitoring data after a predetermine time period or after a number of transmissions have occurred.

Figure 2:
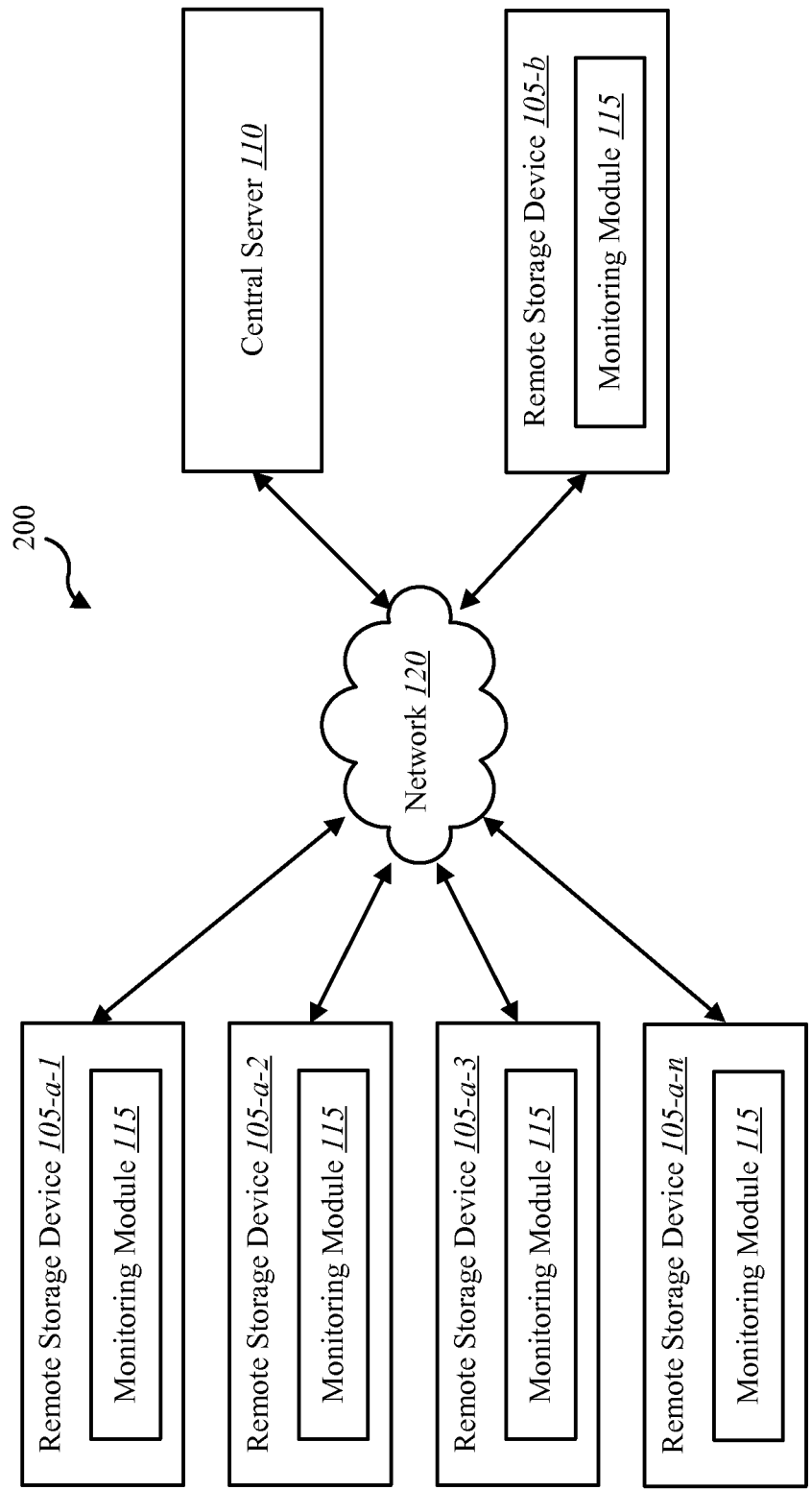
FIG. 2 is a block diagram of another environment in which the present systems and methods may be implemented.

FIG. 2 is a block diagram illustrating one embodiment of an environment 200 in which the present systems may be implement. Environment 200 may include at least some of the components of environment 100 described above. Environment 200 may include a plurality of remote storage devices 105-a, a separate remote storage device 105-b, and a central server 110 that communicate with each other via network 120. Each of the remote storage devices 105 may include monitoring module 115 or at least components thereof.

Remote storage device 105-a and 105-b may represent different levels or groups of remote storage devices in a hierarchal structure for the network. In some examples, remote storage devices 105-a may each locally collect monitoring data associated with that particular remote storage device. The collected monitoring data for the remote storage devices 105-a may be transmitted to remote storage device 105-b at least periodically. Monitoring module 115 of remote storage device 105-b may, on a periodic basis, transmit the monitoring data from remote storage devices 105-a to central server 110. Monitoring module 115 of remote storage device 105-b may also periodically, on the same or a different schedule from transmitting monitoring data from remote storage devices 105-a, transmit the monitoring data collected at remote storage device 105-b associated with remote storage device 105-b. Monitoring module 115 may aggregate or summarize the monitoring data from remote storage devices 105-a prior to transmitting that monitoring data to central server 110.

Each of remote storage devices 105-a and remote storage device 105-b may cache, temporarily or permanently, the collected monitoring data locally for that particular remote storage device. The cached or otherwise stored monitoring data may be maintained for a certain period of time, a number of transmission cycles, or the like as a backup copy of the monitoring data. In at least some examples, the transmission of monitoring data to central server 110 may fail, for example, due to bandwidth restrictions, hardware failures, lost data, or the like. Central server 110 may request re-transmission of the monitoring data in response to a transmission failure. The monitoring modules 115 may re-transmit the monitoring data using the cached or otherwise stored monitoring data on any one of the remote storage devices 105.

In at least some examples, monitoring module 115 may transmit the monitoring data from any one or all of the remote storage devices 105 in a particular hierarchal structure sequentially in portions or packets until all of the monitoring data has been transmitted. Monitoring module 115 may control, for example, the amounts of monitoring data transmitted at any given time, the timing for transmitting the monitoring data, the format of the monitoring data, and the like.

Figure 3:
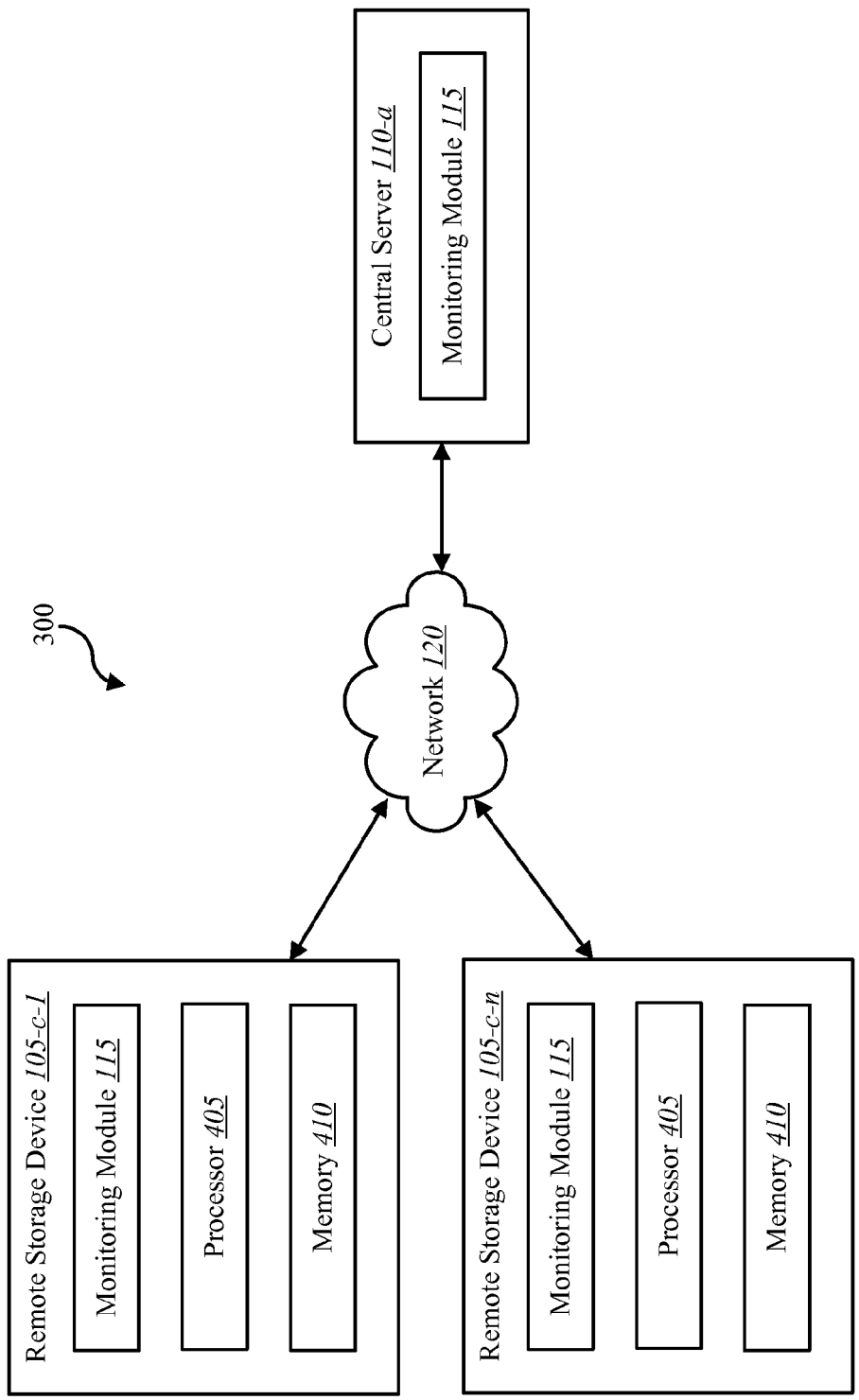
FIG. 3 is a block diagram of another environment in which the present systems and methods may be implemented.

FIG. 3 is a block diagram illustrating one example of an environment 300 in which the present systems and methods may be implemented. Environment 300 may include at least some of the components of environments 100, 200 described above. Environment 300 may include a plurality of remote storage devices 105-c and a central server 110-a that communicate with each other via network 120. The remote storage devices 105-c and central server 110-a may include monitoring module 115 or components thereof. Remote storage devices 105-c may additionally include a processor 405 and memory 410. Processor 405 may assist with operating monitoring module 115 including processing of at least some of the monitoring data collected locally for remote storage devices 105-c, and making determinations related to sending the monitoring data and/or storing the monitoring data. The monitoring data may be stored on memory 410. The memory 410 may be segmented or partitioned to store various types of data. For example, memory 410 may include one segment that is dedicated to storing monitoring data at least temporarily, and other segments dedicated to storing other data such as, for example, data blocks, metadata, and the like.

In at least some examples, monitoring module 115 may operate at least in part on central server 110-a. Monitoring module 115 in this context may operate to receive the monitoring data in some format and according to some schedule or frequency from one or more remote storage devices 105. Monitoring module 115 may facilitate such communications for the monitoring data. Monitoring module 115 may also operate to request further information from remote storage devices 105 such as, for example, a request to re-transmit the monitoring data, a request to re-format the monitoring data, a request for different types of monitoring data, or a request for a different frequency for sending the monitoring data. Monitoring module 115 may operate to store the monitoring data locally at central server 110-a. Monitoring module 115 may operate to perform various processing and other functions related to the monitoring data.

Remote storage devices 105-c may be part of a hierarchical structure for the thousands, hundreds of thousands, or millions of remote storage devices 105 in any given distributed remote storage device network. Each of the remote storage devices 105-c may receive monitoring data from other remote storage devices and may transmit the monitoring data from other storage devices to central server 110-a via network 120. Any one of remote storage devices 105-c may operate to aggregate, summarize, or in some way process or save the monitoring data received from other remote storage devices 105 as well as from locally collected monitoring data from remote storage devices 105-c itself (e.g., prior to transmitting the monitoring data to central server 110-a).

Figure 4:
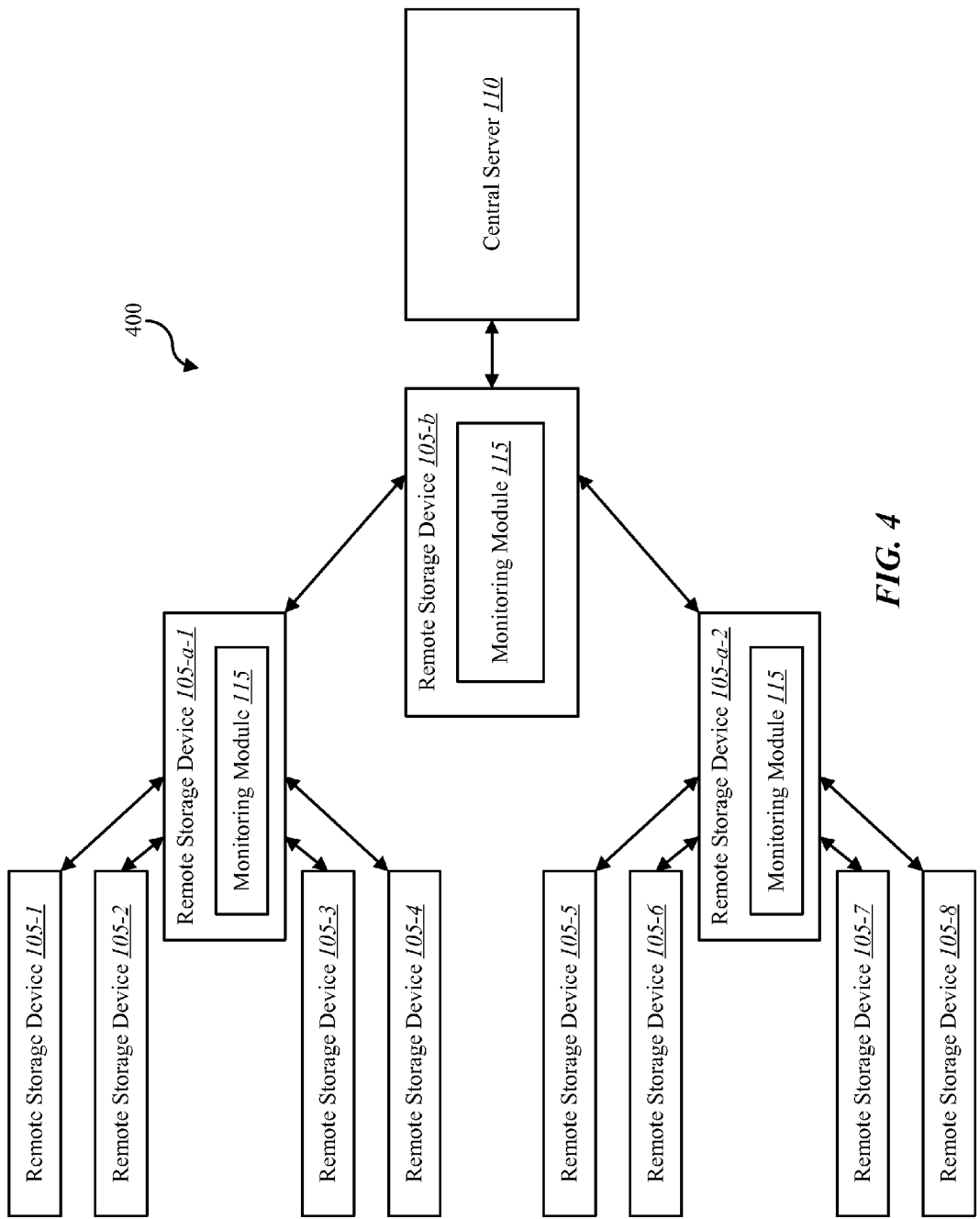
FIG. 4 is a block diagram of another environment in which the present systems and methods may be implemented.

FIG. 4 is a block diagram illustrating one example of an environment 400 in which the present systems and methods may be implemented. Environment 400 may include at least some of the components of environments 100, 200, 300 described above. Environment 400 may include a plurality of remote storage devices 105 arranged in a hierarchical structure. A remote storage devices 105 may be arranged and configured to transmit monitoring data associated with the remote storage devices 105 back to central server 110. Each remote storage device 105 may include monitoring module 115 or at least components thereof.

Environment 400 includes a plurality of remote storage devices 105 arranged in communication with each remote storage device 105-a. Remote storage devices 105-a may locally collect monitoring data associated with itself, and may additionally summarize or aggregate the monitoring data received from a plurality of remote storage devices 105.

Monitoring module 115 may operate at least in part to perform transmission, storing, aggregating and/or summarizing of monitoring data from a remote storage devices 105 and remote storage device 105-*a*. The monitoring data at remote storage devices 105-*a* may be transmitted periodically to remote storage device 105-*b*, which in turn may transmit monitoring data for some or all of the remote storage devices 105 in the hierarchical structure of environment 400 to central server 110.

Monitoring module 115 may operate to maintain the monitoring data for each individual remote storage device 105 separate and distinct from each other even when aggregating and/or summarizing the monitoring data of a plurality of remote storage devices in a given hierarchical structure.

FIG. 4 does not show the network 120 interposed between the various remote storage devices 105, 105-*a*, 105-*b*, and central server 110. However, environment 400 typically would include a network 120 between components of environment 400 to assist with transmitting monitoring data between any one of remote storage devices 105, 105-*a*, 105-*b* and/or between any of the remote storage devices 105, 105-*a*, 105-*b* and central server 110.

Figure 5:
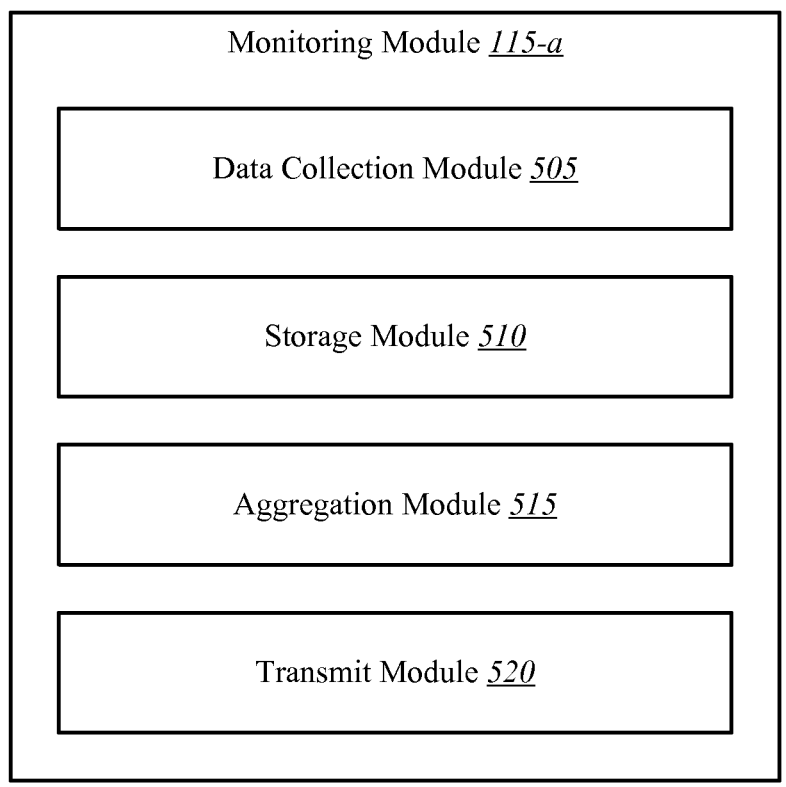
FIG. 5 is a block diagram of a monitoring module of at least one of the environments shown in FIGS. 1-4.

FIG. 5 is a block diagram illustrating an example of monitoring module 115-*a*. Monitoring module 115-*a* may be one example of the monitoring module 115 described above with reference to FIGS. 1-4. Monitoring module 115-*a* may include a data collection module 505, a storage module 510, an aggregation module 515, and a transmit module 520. In other examples, monitoring module 115-*a* may include more or fewer modules than those shown in FIG. 5.

Data collection module 505 may operate to collect data from multiple sources. One source may be a local collection of monitoring data associated with a particular storage device. Another source of data may be monitoring data received from another storage device, wherein the monitoring data is in any desired format including, for example, an aggregate, summary, or constant flow of data. A further source of data may be an aggregate or summary of monitoring data from a plurality of other storage devices in a hierarchical structure of storage devices.

Storage module 510 may operate to store the monitoring data at a particular storage device. For example, storage module 510 may operate to store the locally collected monitoring data for a particular storage device. Storage module 510 may also store monitoring data received from one or more other storage devices. Storage module 510 may temporarily store or cache the monitoring data. Storage module 510 may automatically erase or delete the stored monitoring data after a certain period of time (e.g., after a certain number of cycles of transmitting the monitoring data to another storage device or to the central server 110).

Aggregation module 515 may operate to format or process the collected monitoring data prior to transmitting the monitoring data to another location. Aggregation module 515 may aggregate or consolidate certain of the monitoring data. Aggregation module 515 may summarize or process the monitoring data such as, for example, compressing the data into a reduced size and/or format. Aggregation module 515 may operate to process or format monitoring data in different ways depending on the type of data and/or the source of the monitoring data.

Transmit module 520 may operate to transmit monitoring data from one or more storage devices to a remote location such as, for example, another storage device and/or the central server 110. Transmit module 520 may also control a timing of transmission such as, for example, transmissions on a periodic basis (e.g., data transmission once every 1 minute to 5 minutes, or once a day). Transmit module 520 may operate to transmit monitoring data depending on the operation state of a given storage device or the storage devices from which the monitoring is received.

Figure 6:
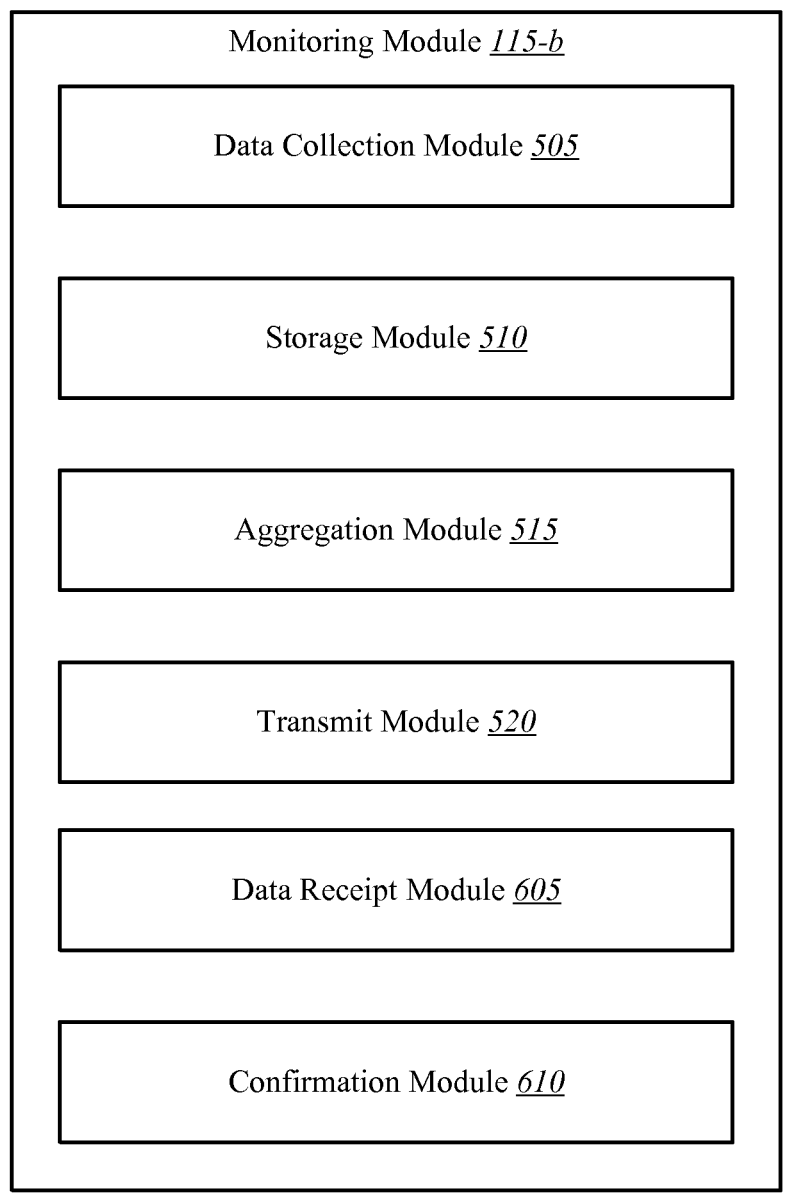
FIG. 6 is a block diagram of a monitoring module of at least one of the environments shown in FIGS. 1-4.

FIG. 6 is a block diagram illustrating another example monitoring module 115-*b*. Monitoring module 115-*b* may be one example of the monitoring module described above with reference to FIGS. 1-4. Monitoring module 115-*b* may include, in addition to data collection module 505, storage module 510, aggregation module 515, and transmit module 520, a data receipt module 605 and a confirmation module 610. In other examples, monitoring module 115-*b* may include more or fewer modules than those shown in FIG. 6.

Data receipt module 605 may assist in receiving and handling monitoring data received from other sources such as, for example, other remote storage devices 105 in a hierarchical structure of storage devices. Data receipt module 605 may handle incoming monitoring data from other sources, whereas data collection module 505 may operate to collect locally generated monitoring data for a particular remote storage device 105 upon which monitoring module 115-*b* is operating at least in part.

Confirmation module 610 may operate to confirm receipt of monitoring data from other storage devices. Confirmation module 610 may operate to confirm receipt of monitoring data transmitted via transmit module 520 to a remote location such as, for example, another storage device and/or the central server 110. In the event that confirmation is not received within a certain period of time, confirmation module may facilitate re-transmission of monitoring data via transmit module 520 to a remote location. Confirmation module 610 may also generate messages, requests, and the like to other storage devices from which monitoring data is received in the event of, for example, incomplete transmission, damaged data, or the like.

Figure 7:
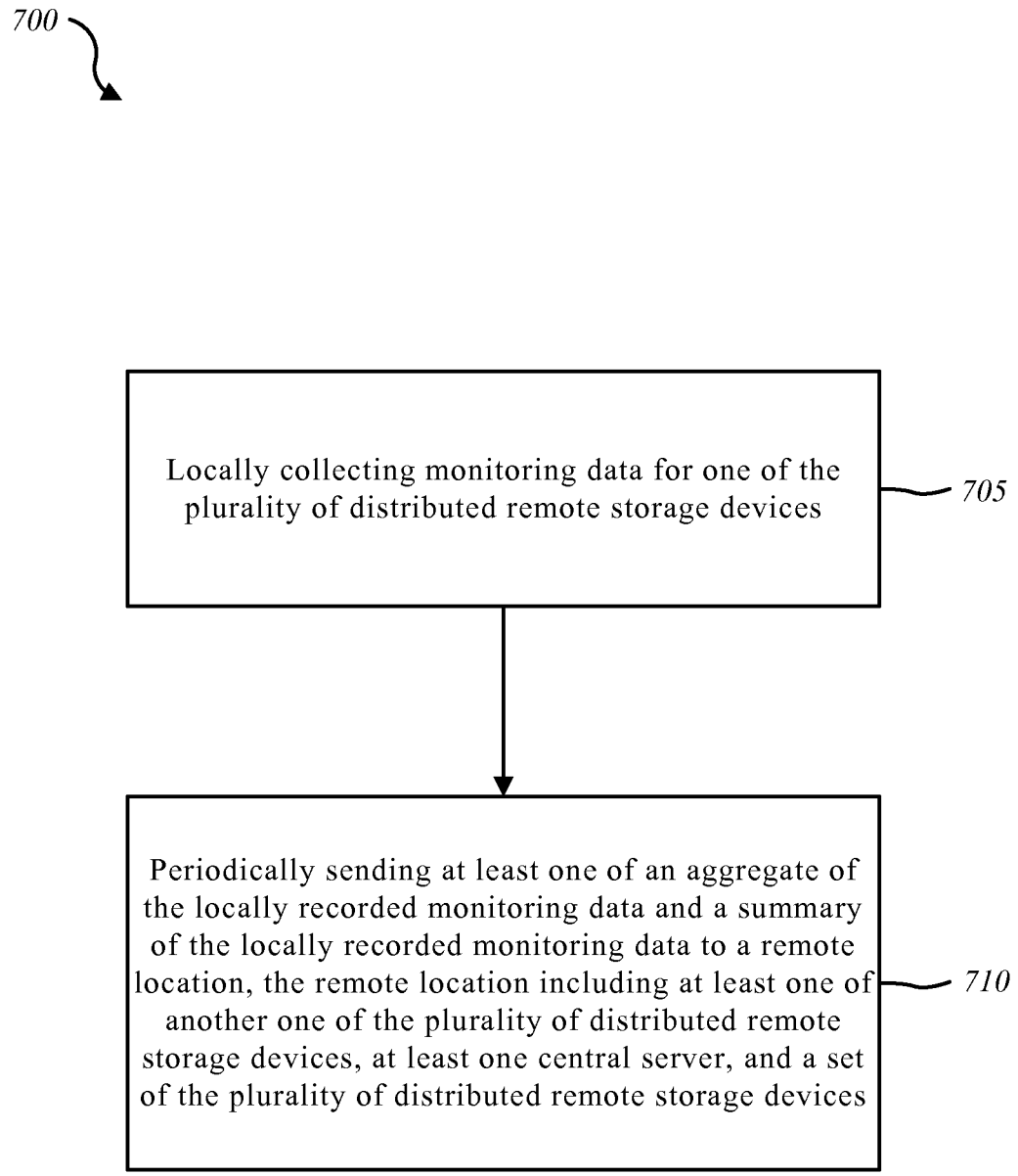
FIG. 7 is a flow diagram illustrating a method for remotely monitoring a plurality of distributed remote storage devices.

FIG. 7 is a block diagram illustrating one embodiment to a method 700 for remotely monitoring a plurality of distributed remote storage devices. In some configurations, method 700 may be implemented by the monitoring module 115 shown and described with reference to FIGS. 1-6. In other examples, method 700 may be performed generally by remote storage device 105 and/or central server 110 shown in FIGS. 1-4, or even more generally by the environments 100, 200, 300, 400 shown in FIGS. 1-4.

At block 705, method 700 includes locally collecting monitoring data for one of the distributed remote storage devices. Block 710 includes periodically sending at least one of an aggregate of the locally recorded monitoring data and a summary of the locally recorded data to a remote location. The remote location includes at least one of another one of the plurality of distributed remote storage devices, at least one central server, and a set of the plurality of distributed remote storage devices.

The method 700 may also provide that the monitoring data include at least one of processor utilization, disc space utilization, input/output load, and network traffic statistics. The monitoring data may include at least one of counts of method invocations, timing data about execution paths, and error and success paths counts. Method 700 may include confirming receipt of the at least one of an aggregate of the locally recorded monitoring data and a summary of the locally recorded monitoring data. Method 700 may include locally storing the monitoring data on one of the distributed remote storage devices. The method 700 may include storing the at least one of an aggregate of the locally recorded monitoring data and a summary of the locally recorded data on one of the distributed remote storage devices. The at least one of the aggregate of the locally recorded monitoring data and a summary of the locally recorded monitoring data is for monitoring data collected within a given time period, and periodically sending a monitoring data includes sending monitoring data from successive time periods.

Figure 8:
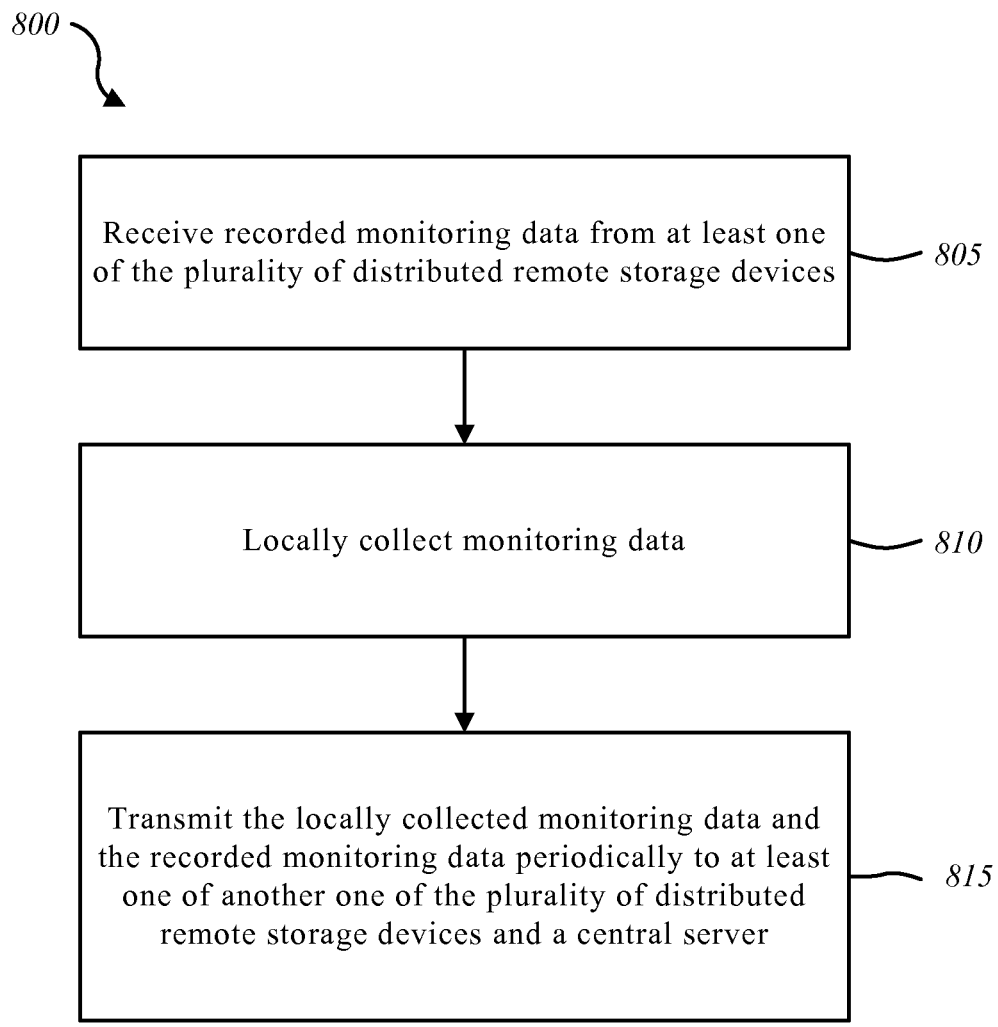
FIG. 8 is a flow diagram illustrating another method for remotely monitoring a plurality of distributed remote storage devices.

FIG. 8 is a block diagram illustrating one embodiment of a method 800 for remotely monitoring a plurality of distributed remote storage devices. In some configurations, the method 800 may be implemented by the monitoring module 115 shown and described with reference to FIGS. 1-6. In one example, method 800 may be performed generally by remote storage device 105 and/or central server 110 shown in FIGS. 1-4, or even more generally by the environments 100, 200, 300, 400 shown in FIGS. 1-4.

At block 805, the method 800 includes receiving recorded monitoring data from at least one of the plurality of distributed remote storage devices. Block 810 includes locally collecting monitoring data. Block 815 includes transmitting the locally collected monitoring data and the recorded monitoring data periodically to at least another one of the plurality of distributed remote storage devices and a central server.

The received recorded monitoring data may include receiving recorded monitoring data from two or more of the plurality of distributed remote storage devices. The method 800 may include caching the locally collected monitoring data between transmitting the locally collected data periodically. The recorded monitoring data may include at least one of an aggregate of the recorded monitoring data and a summary of the recorded monitoring data. The recording monitoring data may be collected locally on the at least one of the plurality of distributed remote storage devices. The monitoring data may include at least one of processor utilization, disc and space utilization, input/output load, network traffic statistics, accounts of method invocations, timing about execution paths, and error and success pack counts. The plurality of distributed remote storage devices may be control panels for home automation systems.

Figure 9:
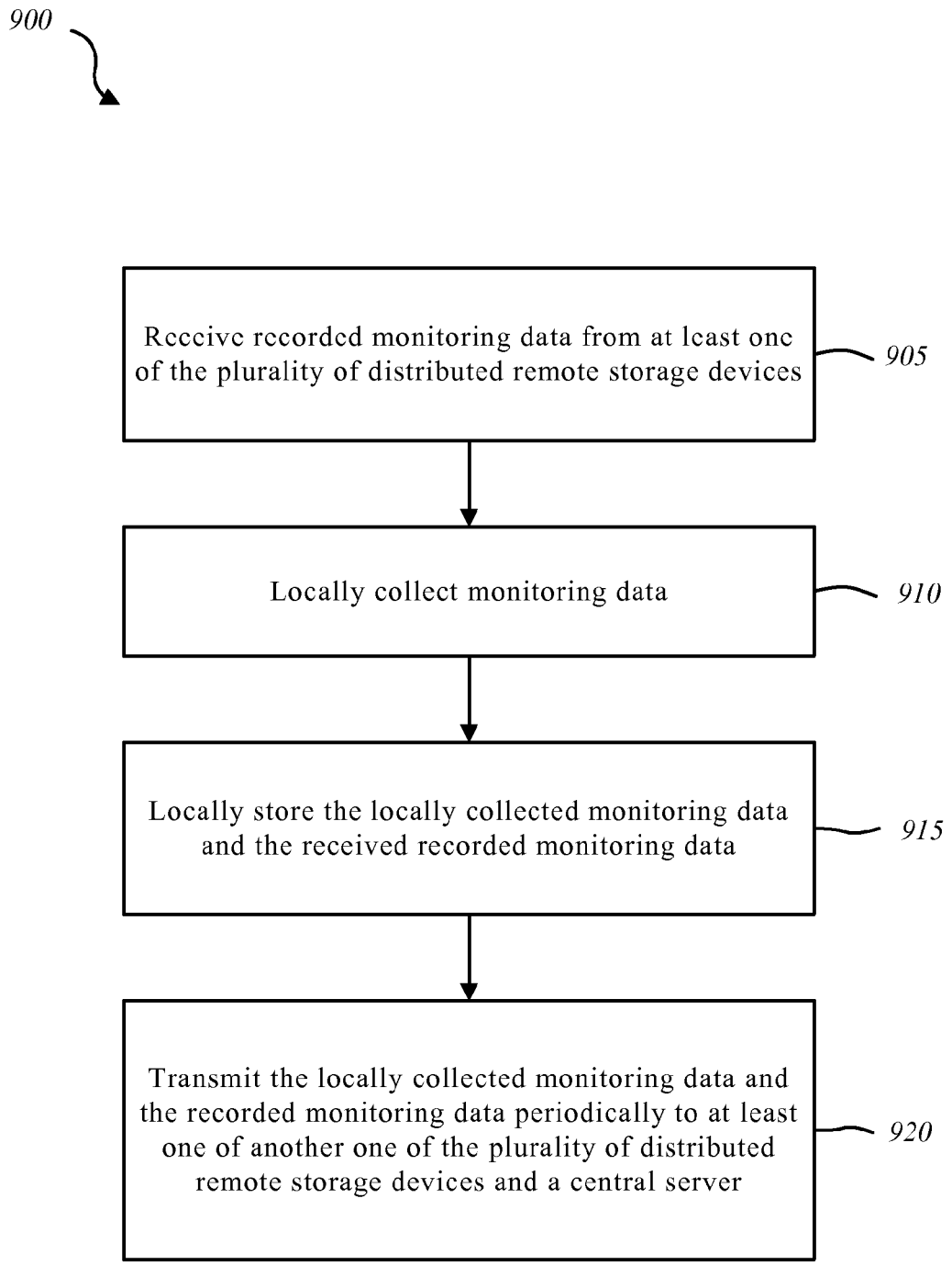
FIG. 9 is a flow diagram illustrating another method for remotely monitoring a plurality of distributed remote storage devices.

FIG. 9 is a block diagram illustrating one embodiment of a method 900 for remotely monitoring a plurality of distributed remote storage devices. The method 900 may, in some configurations, be implemented by the monitoring module 115 shown and described with reference to FIGS. 1-6. In one example, method 900 may be performed generally by remote storage devices 105 and/or central server 110 shown in FIGS. 1-4, or even more generally by the environments 100, 200, 300, 400 shown in FIGS. 1-4.

At block 905, method 900 includes receiving recorded monitoring data from at least one of the plurality of distributed remote storage devices. Block 910 includes locally collecting monitoring data. Block 915 includes locally storing the locally collected monitoring data and the received recorded monitoring data. Block 920 includes transmitting the locally collected monitoring data and the recorded monitoring data periodically to at least one of another one of the plurality of distributed remote storage devices and a central server.

According to method 900, locally collecting monitoring data, locally storing the locally collected monitoring data and the received recorded monitoring data, and transmitting the locally collected monitoring data and the received recorded monitoring data may be performed by one of the plurality of distributed remote storage devices. The recorded monitoring data may be collected locally by the at least one of the plurality of distributed remote storage devices. Transmitting the locally collected monitoring data and the recorded monitoring data may include transmitting at least one of a summary and an aggregate of the locally collected monitoring data and the recorded monitoring data. Receiving recorded monitoring data may include receiving at least one of a plurality and an aggregate of recorded monitoring data from two or more of the plurality of distributed remote storage devices. The method 900 may include receiving a request to re-transmit the locally collected monitoring data and the recorded monitoring data.

Figure 10:
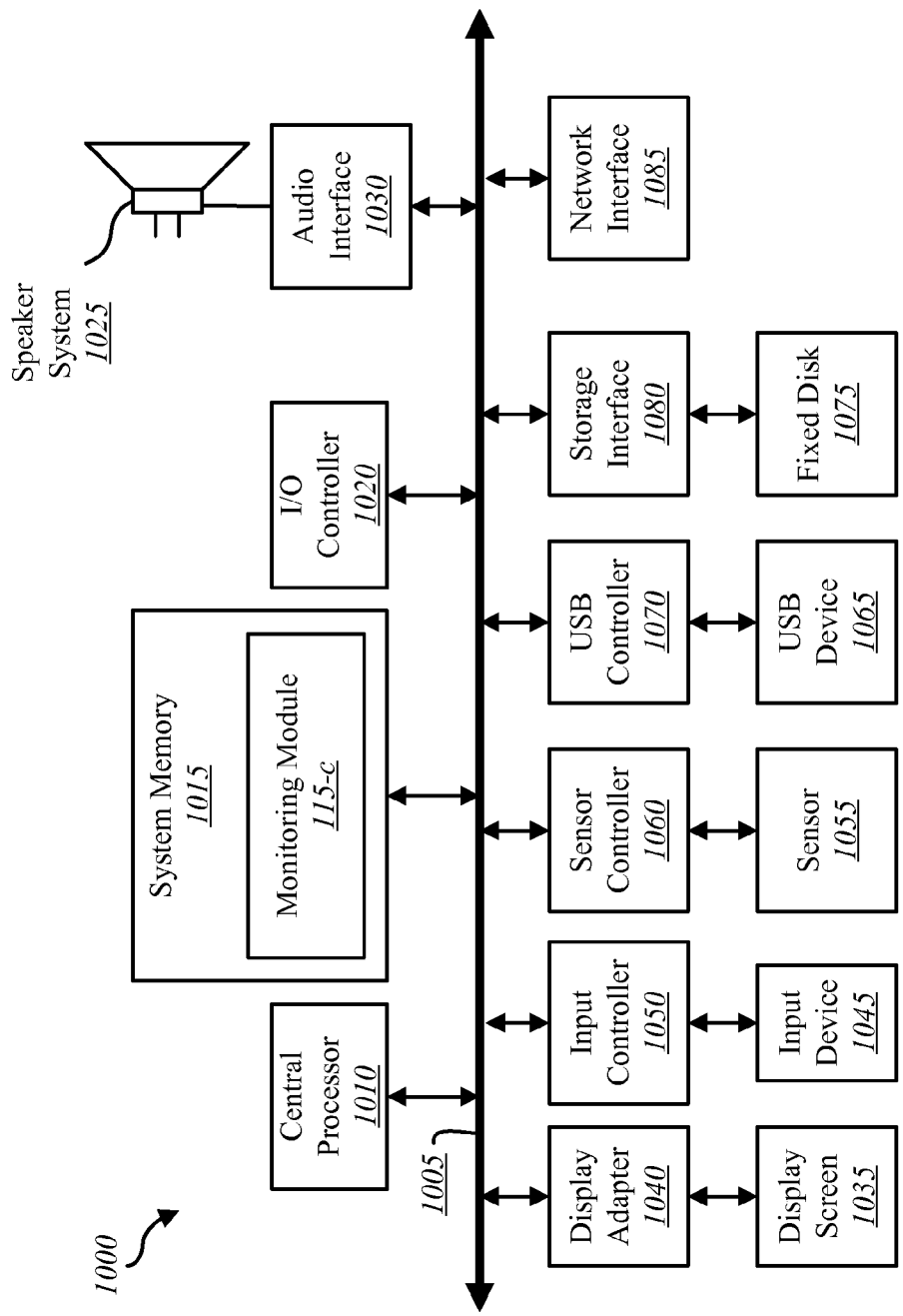
FIG. 10 is a block diagram of a computer system suitable for implementing the present systems and methods of FIGS. 1-9.

FIG. 10 depicts a block diagram of a controller 1000 suitable for implementing the present systems and methods. In one configuration, controller 1000 includes a bus 1005 which interconnects major subsystems of controller 1000, such as a central processor 1010, a system memory 1015 (typically RAM, but which may also include ROM, flash RAM, or the like), an input/output controller 1020, an external audio device, such as a speaker system 1025 via an audio output interface 1030, an external device, such as a display screen 1035 via display adapter 1040, an input device 1045 (e.g., remote control device interfaced with an input controller 1050), multiple USB devices 1065 (interfaced with a USB controller 1070), and a storage interface 1080. Also included are at least one sensor 1055 connected to bus 1005 through a sensor controller 1060 and a network interface 1085 (coupled directly to bus 1005).

Bus 1005 allows data communication between central processor 1010 and system memory 1015, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the monitoring module 115-c to implement the present systems and methods may be stored within the system memory 1015. Applications resident with controller 1000 are generally stored on and accessed via a non-transitory computer readable medium, such as a hard disk drive (e.g., fixed disk drive 1075) or other storage medium. Additionally, applications can be in the form of electronic signals modulated in accordance with the application and data communication technology when accessed via network interface 1085.

Storage interface 1080, as with the other storage interfaces of controller 1000, can connect to a standard computer readable medium for storage and/or retrieval of information, such as a fixed disk drive 1075. Fixed disk drive 1075 may be a part of controller 1000 or may be separate and accessed through other interface systems. Network interface 1085 may provide a direct connection to a remote server via a direct network link to the Internet via a POP (point of presence). Network interface 1085 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 1000 wirelessly via network interface 1085.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 10 need not be present to practice the present systems and methods. The devices and subsystems can be interconnected in different ways from that shown in FIG. 10. The aspect of some operations of a system such as that shown in FIG. 10 are readily known in the art and are not discussed in detail in this application. Code to implement the present disclosure can be stored in a non-transitory computer-readable medium such as one or more of system memory 1015 or fixed disk drive 1075. The operating system provided on controller 1000 may be iOS®, ANDROID®, MS-dOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A computer implemented method for remotely monitoring a plurality of distributed remote storage devices, comprising:
   receiving, at a first distributed remote storage device, a summary of recorded monitoring data from at least one of the plurality of distributed remote storage devices;
   locally collecting, at the first distributed remote storage device, monitoring data for the first distributed remote storage device;
   determining, at the first distributed remote storage device, an aggregate of data using the locally recorded monitoring data and the received summary of recorded monitoring data, and a summary of data using the locally recorded monitoring data and the received summary of recorded monitoring data, the summary of data having a reduced data size compared to the aggregate of data; and
   periodically sending at least one of the aggregate of data and the summary of data to a remote location, the remote location including at least one of another one of the plurality of distributed remote storage devices, at least one central server, and a set of the plurality of distributed remote storage devices.

2. The method of claim 1, wherein the locally recorded monitoring data includes at least one of processor utilization, disk space utilization, input/output load, and network traffic statistics.

3. The method of claim 1, wherein the locally recorded monitoring data includes at least one of counts of method invocations, timing data about execution paths, and error and success path counts.

4. The method of claim 1, further comprising:
   confirming receipt of the at least one of an aggregate of the locally recorded monitoring data and a summary of the locally recorded monitoring data.

5. The method of claim 1, further comprising:
   locally storing the locally recorded monitoring data on the first distributed remote storage device.

6. The method of claim 1, further comprising:
   storing the at least one of an aggregate of the locally recorded monitoring data and a summary of the locally recorded monitoring data on the first distributed remote storage device.

7. The method of claim 1, wherein the at least one of an aggregate of the locally recorded monitoring data and a summary of the locally recorded monitoring data is for locally recorded monitoring data collected within a time period, and periodically sending the monitoring data includes sending the locally recorded monitoring data from successive time periods.

8. A computer-program product for remotely monitoring a plurality of distributed remote storage devices, the computer-program product comprising a non-transitory computer-readable medium storing instructions executable by a processor to:
   receive, at a first distributed remote storage device, a summary of recorded monitoring data from at least one of the plurality of distributed remote storage devices;
   locally collect, at the first distributed remote storage device, monitoring data for the first distributed remote storage device;
   determine, at the first distributed remote storage device, an aggregate of data using the locally collected monitoring data and the received summary of recorded monitoring data, and a summary of data using the locally collected monitoring data and the received summary of recorded monitoring data, the summary of data having a reduced data size compared to the aggregate of data; and
   transmit the aggregate of data and the summary of data periodically to at least one of another one of the plurality of distributed remote storage devices and a central server.

9. The computer-program product of claim 8, wherein the summary of received recorded monitoring data includes receiving the summary of locally recorded monitoring data from two or more of the plurality of distributed remote storage devices.

10. The computer-program product of claim 8, wherein the instructions are executable by the processor to:
   cache the locally collected monitoring data between transmitting the locally collected monitoring data periodically.

11. The computer-program product of claim 8, wherein the recorded monitoring data includes at least one of an aggregate of the recorded monitoring data and the summary of the recorded monitoring data.

12. The computer-program product of claim 8, wherein the summary of recorded monitoring data is collected locally on the at least one the plurality of distributed remote storage devices.

13. The computer-program product of claim 8, wherein the locally collected monitoring data includes at least one of processor utilization, disk space utilization, input/output load, network traffic statistics, counts of method invocations, timing data about execution paths, and error and success path counts.

14. The computer-program product of claim 8, wherein the plurality of distributed remote storage devices are control panels for home automation systems.

15. An apparatus for remotely monitoring a plurality of distributed remote storage devices, comprising:
   a processor;
   a memory in electronic communication with the processor; and
   instructions stored in the memory, the instructions being executable by the processor to:
      receive, at a first distributed remote storage device, a summary of recorded monitoring data from at least one of the plurality of distributed remote storage devices;
      locally collect, at the first distributed remote storage device, monitoring data for the first distributed remote storage device;
      locally store, at the first distributed remote storage device, the locally collected monitoring data and the received recorded monitoring data;
      determine, at the first distributed remote storage device, an aggregate of data using the locally collected monitoring data and the received summary of recorded monitoring data, and a summary of data using the locally collected monitoring data and the received summary of recorded monitoring data, the summary of data having a reduced data size compared to the aggregate of data; and
      transmit the aggregate of data and the summary of data periodically to at least one of another one of the plurality of distributed remote storage devices and a central server.

16. The apparatus of claim 15, wherein locally collecting monitoring data, locally storing the locally collected monitoring data and the received recorded monitoring data, and transmitting the locally collected monitoring data and the received recorded monitoring data is performed by one of the plurality of distributed remote storage devices.

17. The apparatus of claim 15, wherein the summary of recorded monitoring data is collected locally by the at least one of the plurality of distributed remote storage devices.

18. The apparatus of claim 15, wherein transmitting the locally collected monitoring data and the summary of recorded monitoring data includes transmitting at least one of a summary and an aggregate of the locally collected monitoring data and the summary of recorded monitoring data.

19. The apparatus of claim 15, wherein receiving recorded monitoring data includes receiving at least one of a summary and an aggregate of recorded monitoring data from two or more of the plurality of distributed remote storage devices.

20. The apparatus of claim 15, wherein the instructions are executable by the processor to:
   receive a request to re-transmit the locally collected monitoring data and the summary of recorded monitoring data.

* * * * *